US009201278B2

(12) United States Patent
Wang et al.

(10) Patent No.: US 9,201,278 B2
(45) Date of Patent: Dec. 1, 2015

(54) ARRAY SUBSTRATE AND DISPLAY DEVICE COMPRISING A FIRST TRANSPARENT CONDUCTIVE LAYER HAVING A PLURALITY OF PROTRUSIONS CORRESPONDING TO A PLURALITY OF SLIT STRUCTURES

(71) Applicant: BEIJING BOE OPTOELECTRONICS TECHNOLOGY CO., LTD., Beijing (CN)

(72) Inventors: Yongcan Wang, Beijing (CN); Hongming Zhan, Beijing (CN); Lifeng Lin, Beijing (CN)

(73) Assignee: BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 229 days.

(21) Appl. No.: 13/822,150

(22) PCT Filed: Nov. 19, 2012

(86) PCT No.: PCT/CN2012/084839
§ 371 (c)(1),
(2) Date: Mar. 11, 2013

(87) PCT Pub. No.: WO2013/113231
PCT Pub. Date: Aug. 8, 2013

(65) Prior Publication Data
US 2014/0167274 A1 Jun. 19, 2014

(30) Foreign Application Priority Data
Feb. 2, 2012 (CN) .......................... 2012 1 0022962

(51) Int. Cl.
*G02F 1/1343* (2006.01)
*G02F 1/1339* (2006.01)

(52) U.S. Cl.
CPC ...... *G02F 1/13439* (2013.01); *G02F 1/134309* (2013.01); *G02F 1/134363* (2013.01)

(58) Field of Classification Search
CPC ...................... G02F 1/13439; G02F 1/134309
USPC ........................................ 349/132, 139, 141
See application file for complete search history.

(56) References Cited

U.S. PATENT DOCUMENTS

| 2009/0284707 | A1* | 11/2009 | Cho et al. | 349/160 |
| 2010/0302492 | A1* | 12/2010 | Kubota et al. | 349/138 |
| 2012/0242942 | A1* | 9/2012 | Jeon | 349/141 |

FOREIGN PATENT DOCUMENTS

| CN | 101211072 A | 7/2008 |
| CN | 101995707 A * | 3/2011 |

(Continued)

OTHER PUBLICATIONS

Chinese Rejection Decision dated Jun. 19, 2014; Appln. No. 201210022962.8.

(Continued)

*Primary Examiner* — Paul Lee
(74) *Attorney, Agent, or Firm* — Ladas & Parry LLP

(57) ABSTRACT

The embodiments of the present invention disclose an array substrate and a display device. The array substrate comprises a substrate and a first transparent conductive layer, an insulating layer and a second transparent conductive layer sequentially formed on the substrate, wherein the second transparent conductive layer has a plurality of slit structures, the first transparent conductive layer has a plurality of protrusions corresponding to the plurality of slit structures, and a height of the plurality of protrusions is smaller than a distance between the first transparent conductive layer and the second transparent conductive layer.

13 Claims, 4 Drawing Sheets

(56) References Cited

FOREIGN PATENT DOCUMENTS

| | | |
|---|---|---|
| CN | 102629040 A | 8/2012 |
| JP | 2007-034151 A | 2/2007 |
| JP | 2007-171740 A | 7/2007 |

OTHER PUBLICATIONS

First Chinese Office Action dated Aug. 30, 2013; Appln. No. 201210022962.8.

Second Chinese Office Action dated Jan. 13, 2014; Appln. No. 201210022962.8.

Third Chinese Office Action dated Apr. 13, 2014; Appln. No. 201210022962.8.

International Preliminary Report on Patentability dated Aug. 5, 2014; PCT/CN2012/084839.

International Search Report; mailed Feb. 28, 2013; PCT/CN2012/084839.

* cited by examiner the array substrate of the embodiment of the present invention and of the liquid crystal display panel of the prior art of the ADS mode, which is obtained by simulation; and

ARRAY SUBSTRATE AND DISPLAY DEVICE COMPRISING A FIRST TRANSPARENT CONDUCTIVE LAYER HAVING A PLURALITY OF PROTRUSIONS CORRESPONDING TO A PLURALITY OF SLIT STRUCTURES

TECHNICAL FIELD

Embodiments of the present invention relate to an array substrate and a display device.

BACKGROUND

With such advantages as small volume, low power consumption, low manufacturing costs and less radiation, Thin Film Transistor Liquid Crystal Displays (TFT-LCDs) have dominated the current market of flat panel displays.

At present, TFT-LCDs include the following main display modes: Twisted Nematic (TN) mode, Vertical Alignment (VA) mode, In-Plane-Switching (IPS) mode, and Advanced Super Dimension Switch (ADSDS or ADS) mode. The ADS mode is a liquid crystal display mode that can broaden the viewing angles, in which mode a multi-dimensional electric field is formed with an electric field produced at edges of slit electrodes on a same plane and an electric field produced between a layer of the slit electrodes and a layer of a plate-like electrode, so as to allow liquid crystal molecules at all orientations within a liquid crystal cell, which are located between the slit electrodes and directly above the slit electrodes, to be rotated, thereby enhancing the work efficiency of liquid crystals and increasing the light transmittance. The ADS mode can improve the picture quality of TFT-LCD products, and has advantages such as high resolution, high transmittance, low power consumption, wide viewing angle, high aperture ratio, low chromatic aberration, no push Mura, and etc.

As shown in FIG. 1, in a normal driving state of pixel, the pixel structure of the ADS mode liquid crystal display panel in the prior art forms a multi-dimensional electric field by the voltage difference between a pixel electrode 21 (a plate-like electrode) and a common electrode 22 (a slit electrode), and can better control the actions of the liquid crystal molecules so as to realize black-and-white and grey scale display. As shown in FIGS. 2 and 3, however, due to the design of electrodes per se, the electric field above the slit electrodes has a greater horizontal component and thus has higher light transmittance because it is easy for the polarization light to transmit through the panel with the horizontal deflection of the liquid crystal, while the electric field away from the slit electrodes (i.e., above the slits) has a greater vertical component and a lower light transmittance. As a result, the liquid crystal panel has a relatively low light transmittance as a whole.

SUMMARY

One embodiment of the present invention provides an array substrate, which comprises a substrate and a first transparent conductive layer, an insulating layer and a second transparent conductive layer which are sequentially formed on the substrate, wherein the second transparent conductive layer has a plurality of slit structures, the first transparent conductive layer has a plurality of protrusions corresponding to the plurality of slit structures, and a height of the plurality of protrusions is smaller than a distance between the first transparent conductive layer and the second transparent conductive layer.

Another embodiment of the present invention provides a display device, which comprises the aforesaid array substrate.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

In order to solve the technical problem that the overall light transmittance of the ADS mode liquid crystal display panel is relatively low in the prior art, the embodiments of the present provide an array substrate and a display device comprising the array substrate.

Figure 1:
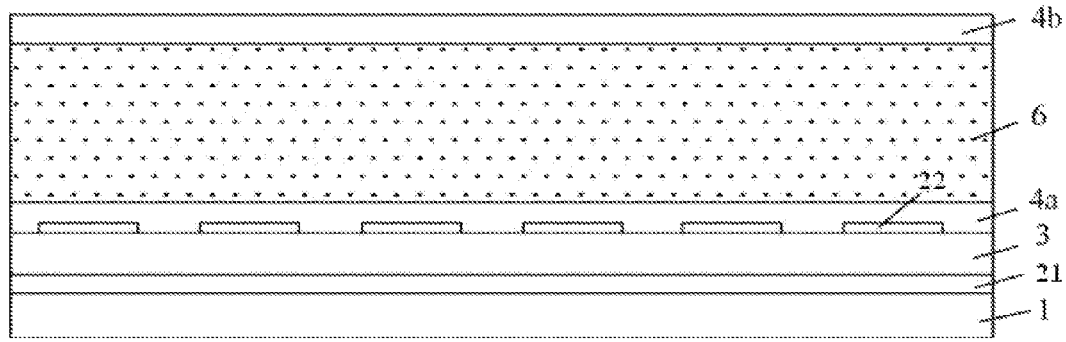
FIG. 1 is a sectional schematic view of the pixel structure of an ADS mode liquid crystal display panel of the prior art.
Figure 2:
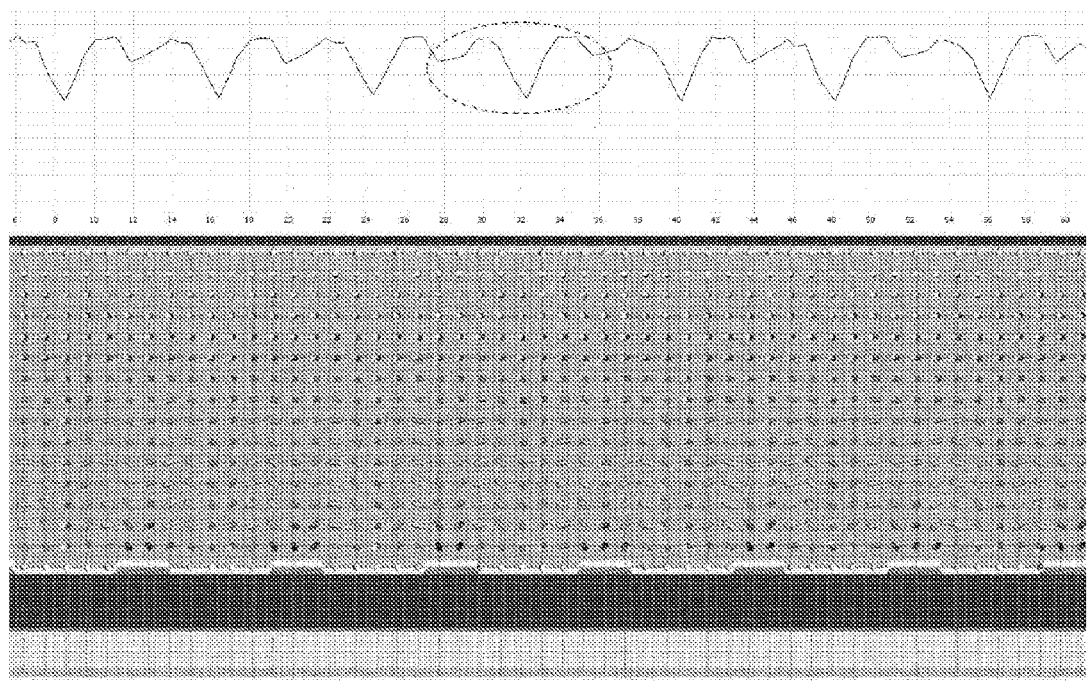
FIG. 2 is a diagram of light transmittance at the section of the ADS mode liquid crystal display panel of the prior art obtained by simulation.
Figure 3:
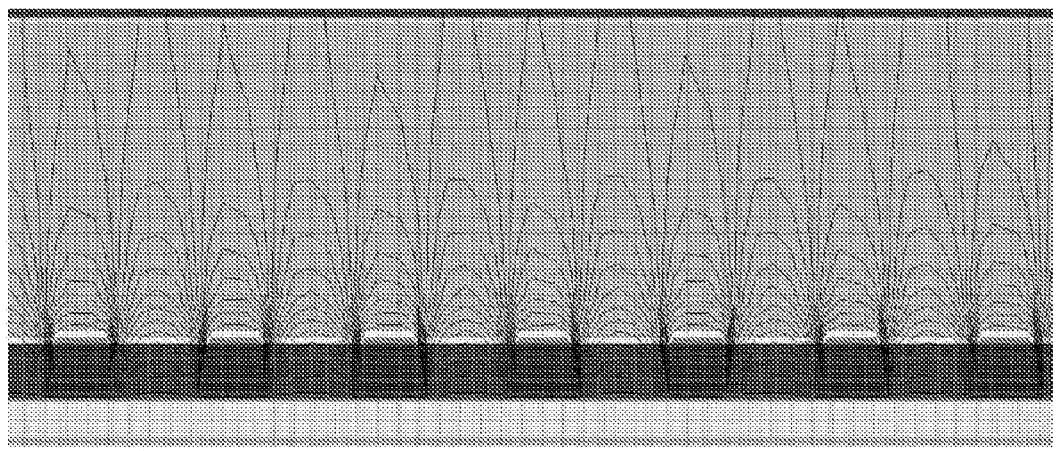
FIG. 3 is a diagram of electric field distribution at the section of the ADS mode liquid crystal display panel of the prior art obtained by simulation.
Figure 4:
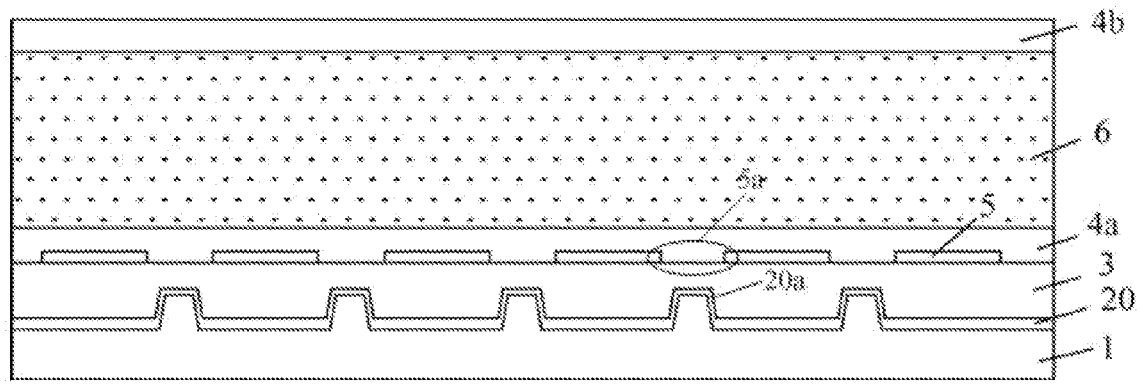
FIG. 4 is a sectional schematic view of the pixel structure of the array substrate of the embodiment of the present invention.
Figure 5:
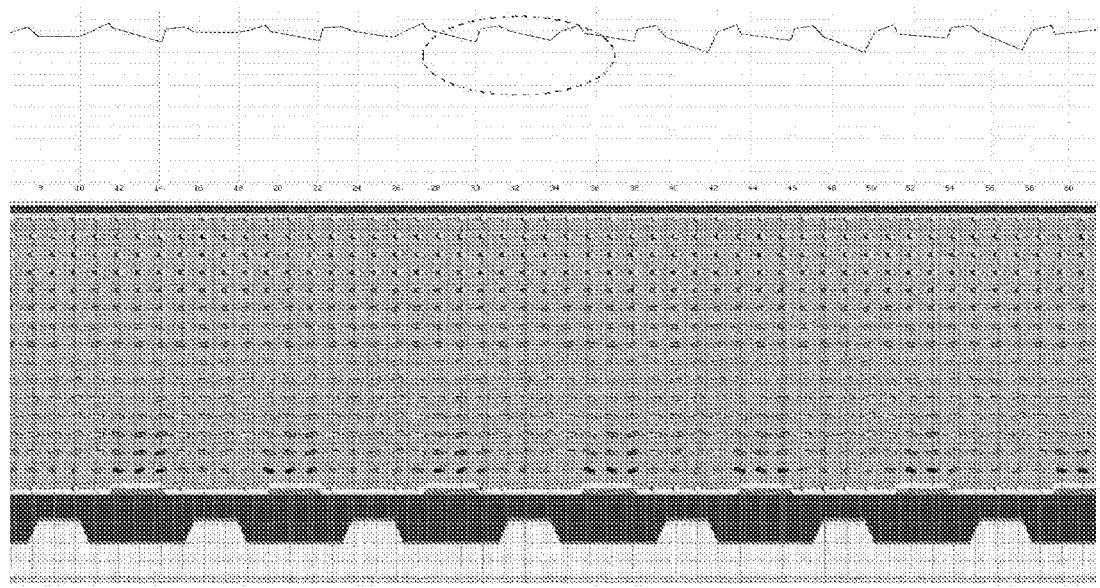
FIG. 5 is a diagram of light transmittance at the section of the array substrate of the embodiment of the present invention obtained by simulation.
Figure 6:
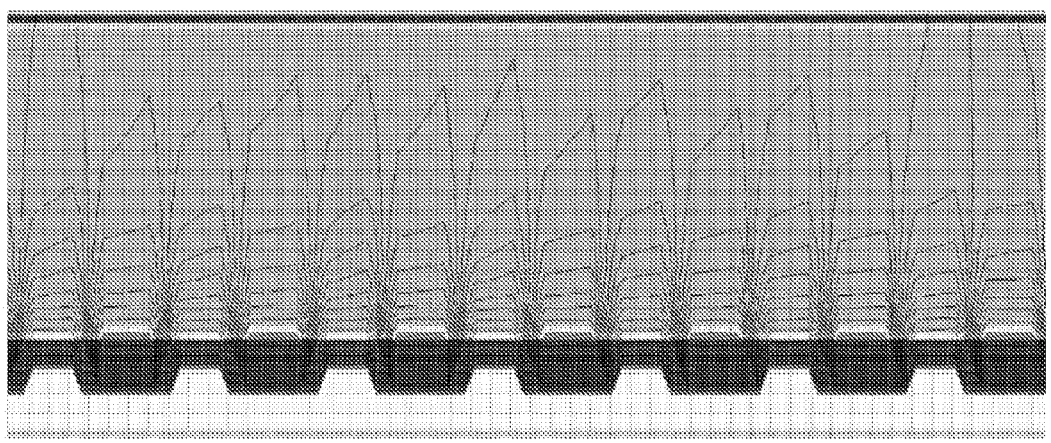
FIG. 6 is a diagram of electric field distribution at the section of the array substrate of the embodiment of the present invention obtained by simulation.

The array substrate of the embodiment of the present invention will be described below in detail with reference to FIG. 4. As shown in FIG. 4, the array substrate of the embodiment of the present invention may comprise e.g. a substrate (not shown) and a first transparent conductive layer 20, an insulating layer 3 and a second transparent conductive layer 5 sequentially formed on the substrate; the second transparent conductive layer 5 has a plurality of slit structures 5a, the first transparent conductive layer 20 has a plurality of protrusions 20a corresponding to the plurality of slit structures 5a, and a height of the plurality of protrusions 20a is smaller than a distance between the first transparent conductive layer 20 and the second transparent conductive layer 5.

In the present embodiment, as shown in FIG. 4, the first transparent conductive layer 20 is a pixel electrode, and the second transparent conductive layer 5 is a common electrode, but the embodiments of the present invention are not limited to this.

In addition, the array substrate of the embodiment of the present invention may further comprise a first insulating layer 1 formed on the substrate. In this case, the first transparent conductive layer 20 serving as the pixel electrode is formed on the first insulating layer 1, the insulating layer 3 is formed on the pixel electrode, i.e., the first transparent conductive layer 20, and the second transparent conductive layer 5 having a plurality of slit structures 5a, i.e., the common electrode, is formed on the insulating layer 3.

In the present embodiment, the second transparent conductive layer 5 serving as the common electrode is further provided with a lower alignment layer 4a which covers over the common electrode; an upper alignment layer 4b is provided above the lower alignment layer 4a, and a liquid crystal layer 6 is located between the lower alignment layer 4a and the upper alignment layer 4b.

In the present embodiment, the common electrode has a plurality of slit structures 5a, the pixel electrode has a plurality of protrusions 20a corresponding to the plurality of slit structures 5a of the common electrode, and a height of the plurality of protrusions 20a is smaller than a distance between the pixel electrode and the common electrode. But, the embodiments of the present invention are not limited to this.

In another embodiment of the present invention, the first transparent conductive layer is a common electrode, and the second transparent conductive layer is a pixel electrode. In this case, the pixel electrode has a plurality of slit structures, the common electrode has a plurality of protrusions corresponding to the plurality of slit structures of the pixel electrode, and a height of the plurality of protrusions is smaller than a distance between the common electrode and the pixel electrode.

In the embodiments of the present invention, intervals between adjacent two slit structures of the plurality of slit structures 5a are equal to each other, and intervals between adjacent two protrusions of the plurality of protrusions 20a corresponding to the plurality of slit structures 5a are equal to each other, whereby the overall distribution of electric field of the whole pixel structure is uniform.

In the embodiments of the present invention, the pattern of the slit structures 5a may be a strip of a comb shape, a semi-circular shape, a step shape, and etc. But, the embodiments of the present invention are not limited to this, as long as a multi-dimensional electric field for driving the liquid crystal molecules to rotate horizontally may be formed on the second transparent conductive layer 5.

In the embodiments of the present invention, the height of the plurality of protrusions 20a may take a half of the distance between the first transparent conductive layer 20 and the second transparent conductive layer 5 as a central value and can be within a preset deviation range. In some of the embodiments of the present invention, for example, the height of the plurality of protrusions 20a may be a half of the distance between the first transparent conductive layer 20 and the second transparent conductive layer 5. Thus, in full consideration of the feasibility of the manufacturing process, a notch edge of each slit is brought closer to an upper portion of each protrusion such that the component in horizontal direction of the multi-dimensional electric field is significantly increased.

In the embodiments of the present invention, the plurality of protrusions 20a may be of a profile of an isosceles trapezoid, an arc, a triangle and etc., but is not limited to the said shapes. In some of embodiments of the present invention, for example, the plurality of protrusions 20a may be of a profile of an isosceles trapezoid. Since it is easier to realize isosceles trapezoid in the patterning process, the production efficiency will be improved and the costs saved.

In addition, in the embodiments of the present invention, when the plurality of protrusions 20 has a profile of an isosceles trapezoid, base angles of the isosceles trapezoid may be less than or equal to 60 degrees in consideration of the manufacturing process.

In the present embodiment, as shown in FIG. 4, the protrusions 20a of the first transparent conductive layer 20 are designed as hollow protrusions formed of films being bent, i.e., in the case that the first insulating layer 1 under the first transparent conductive layer 20 has protrusion structures, the first transparent conductive layer 20 above the first insulating layer 1 will be naturally shaped into the hollow protrusions formed of films being bent, which may be formed by physically sputter deposition as the first transparent conductive layer 20, thereby saving the costs. In another embodiment of the present invention, the protrusions may be designed as solid protrusions, i.e., the protrusions are formed on the first transparent conductive layer by photolithographic and etching processes such that the protrusions are totally formed of the material of the first transparent conductive layer and are integrally formed with the first transparent conductive layer.

In some embodiments of the present invention, e.g. each of the slit structures 5a is corresponding to at least one of the protrusion 20a. For example, the protrusions 20a may be long frustums disposed to be parallel with the slit structures 5a, in which case one slit structure corresponds to one protrusion. In some embodiments of the present invention, the protrusions also may be at least two dot-like protrusions corresponding to a slit structure, in which case one slit structure corresponds to at least two protrusions.

Figure 7:
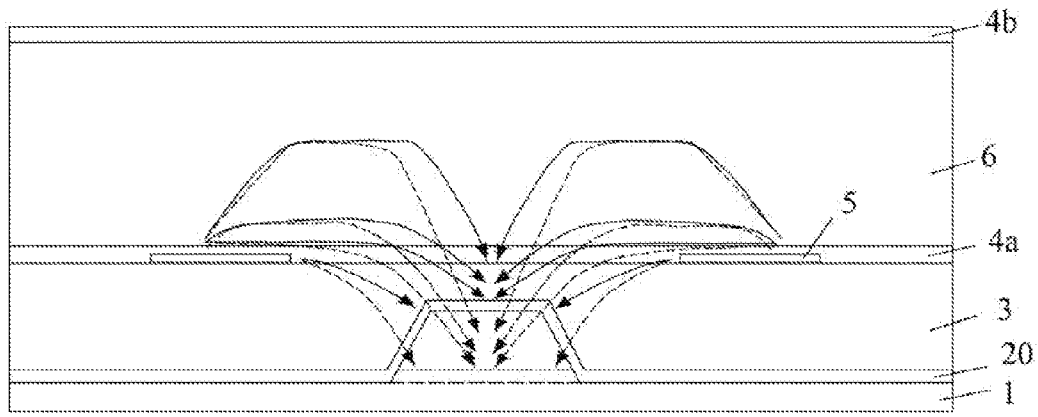
FIG. 7 is a diagram of electric field distribution at the cross section of the array substrate of the embodiment of the present invention and of the liquid crystal display panel of the prior art of the ADS mode, which is obtained by simulation.

In the array substrate of the embodiments of the present invention, when the pixels are normally driven, the voltages of the pixel electrode in any pixel region become the same, and the multi-dimensional electric field formed by the pixel electrode and the common electrode drives the liquid crystal molecules to deflect so as to realize black-and-white and grey scale display. FIG. 7 shows electric field distributions at a set of slit structures, wherein the solid line represents the electric field distribution in the array substrate of the embodiment of the present invention, while the dotted line represents the electric field distribution in an ADS mode liquid crystal display panel of the prior art. By comparing the curves of the two electric field distributions in the FIG. 7, generally it can be seen that the component in horizontal direction of the electric field in the array substrate of the embodiment of the present invention is much greater than the component in horizontal direction of the electric field of the ADS mode liquid crystal display panel of the prior art, whereby the array substrate of the embodiment of the present invention can greatly increase the light transmittance of the panel.

FIGS. 2, 3, 5 and 6 are figures showing the pixel light transmittance and the electric field distribution of the array substrates of an embodiment of the present invention and a liquid crystal display panel of the prior art of the ADS mode, which are obtained by simulation using simulation software. By comparing FIG. 3 with FIG. 6, it can be seen that the component in the horizontal direction of the electric field in slit regions in the embodiment of the present invention is much greater than the component in the horizontal direction of the electric field in slit regions in the prior art. By comparing FIG. 2 with FIG. 5, it can be seen that the light transmittance in the slit structure and away from the notch edges of the slits in the array substrate of the embodiment of the present invention has been greatly increased compared with the prior art.

Figure 8:
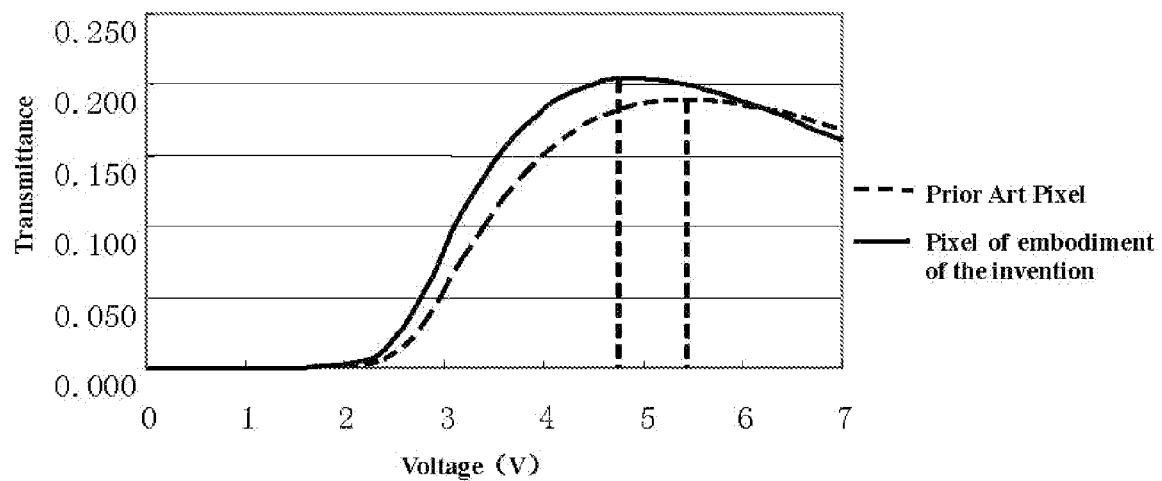
FIG. 8 is a curve diagram of voltage-transmittance at the cross section of the array substrate of the embodiment of the present invention and of the liquid crystal display panel of the prior art of the ADS mode, which is obtained by simulation.

As shown in FIG. 4 to FIG. 7, due to the use of the protrusion structures corresponding to the slit structures, the surface area of the pixel electrode is greatly increased compared with the prior art, whereby the strength of the electric field formed by the pixel electrode and the common electrode is increased, the pixel voltage is reduced while the light transmittance of the panel is improved, and thus the power consumption of the display panel is reduced accordingly. FIG. 8 is a curve diagram of voltage-transmittance at the cross-section of the array substrate of the embodiment of the present invention and of a liquid crystal display panel of the prior art of the ADS mode, which is obtained by simulation. By comparing the curves in FIG. 8, it can be seen that the light transmittance of the array substrate of the present invention is greatly increased compared with the prior art, while the pixel voltage is relatively reduced.

An embodiment of the present invention further provides a display device, including the liquid crystal display device and the display device of other types. In the embodiments of the present invention, the liquid crystal display device may be a liquid crystal panel, a liquid crystal television, a mobile phone, a liquid crystal display and etc, which may comprise a color filter substrate and the array substrate in the aforementioned embodiments. The display device of other types may be for example an e-paper device, which may not comprise a color filter substrate but comprises the array substrate in the aforementioned embodiments.

The above embodiments are used for illustrating the technical solutions of the present invention only and not limitative to the scope of the disclosure. While the present invention has been detailedly described with reference to the foregoing embodiments, it shall be understood by those skilled in the art that any amendment to the technical solutions or substitution for some of the technical features shall also be allowed without departing from the scope and spirit of the present invention.

The invention claimed is:

1. An array substrate, comprising a substrate and a first transparent conductive layer, an insulating layer and a second transparent conductive layer which are sequentially formed on the substrate, wherein the second transparent conductive layer has a plurality of slit structures, the first transparent conductive layer has a plurality of protrusions corresponding to the plurality of slit structures, a height of the plurality of protrusions is smaller than a distance between the first transparent conductive layer and the second transparent conductive layer, and an entire surface of the insulating layer exposed by the plurality of slit structures is flat.

2. The array substrate according to claim 1, wherein the height of the protrusions is a half of the distance between the first transparent conductive layer and the second transparent conductive layer.

3. The array substrate according to claim 1, wherein the protrusions have a cross section in a shape of an isosceles trapezoid, an arc, or a triangle.

4. The array substrate according to claim 3, wherein the protrusions have a cross section in a shape of an isosceles trapezoid and base angles of the isosceles trapezoid are less than or equal to 60 degrees.

5. The array substrate according to claim 1, wherein each of the slit structures corresponds to at least one of the protrusions.

6. The array substrate according to claim 1, wherein the protrusions are hollow protrusions formed of a bent film of the first transparent conductive layer.

7. The array substrate according to claim 1, wherein intervals between adjacent two slit structures of the plurality of slit structures are equal to each other; and intervals between adjacent two protrusions of the plurality of protrusions corresponding to the plurality of slit structures are equal to each other.

8. The array substrate according to claim 1, wherein the first transparent conductive layer is a pixel electrode, and the second transparent conductive layer is a common electrode.

9. The array substrate according to claim 1, wherein the first transparent conductive layer is a common electrode, and the second transparent conductive layer is a pixel electrode.

10. The array substrate according to claim 1, further comprising a first insulating layer, the first insulating layer being formed between the substrate and the first transparent conductive layer.

11. The array substrate according to claim 1, wherein the height of the protrusions is a half of the distance between the first transparent conductive layer and the second transparent conductive layer.

12. A display device, comprising an array substrate according to claim 1.

13. The array substrate according to claim 1, wherein the protrusions are solid protrusions formed on the first transparent conductive layer by photolithographic and etching processes.

* * * * *